(No Model.)

W. DUNBAR.
SAW.

No. 465,969. Patented Dec. 29, 1891.

Witnesses
Chas. E. Riordon.
J. H. Riordon

William Dunbar, Inventor
By his Attorney W. S. Boyd.

THE NORRIS PETERS CO., PHOTO-LITHO., WASHINGTON, D. C.

UNITED STATES PATENT OFFICE.

WILLIAM DUNBAR, OF LARABEE, PENNSYLVANIA, ASSIGNOR OF ONE-HALF TO JUDSON J. NEWMAN, OF BUFFALO, NEW YORK.

SAW.

SPECIFICATION forming part of Letters Patent No. 465,969, dated December 29, 1891.

Application filed February 25, 1889. Serial No. 301,068. (No model.)

*To all whom it may concern:*

Be it known that I, WILLIAM DUNBAR, a citizen of the United States, residing at Larabee, in the county of McKean and State of Pennsylvania, have invented certain new and useful Improvements in Saws; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain improvements in that class of saws in which the teeth are inserted into the saw, and more particularly to that class in which the tooth is made of a single piece and fitted into the plate with a V-groove extending around the socket.

I will now proceed to definitely describe the nature of my improvement.

Figure 1:
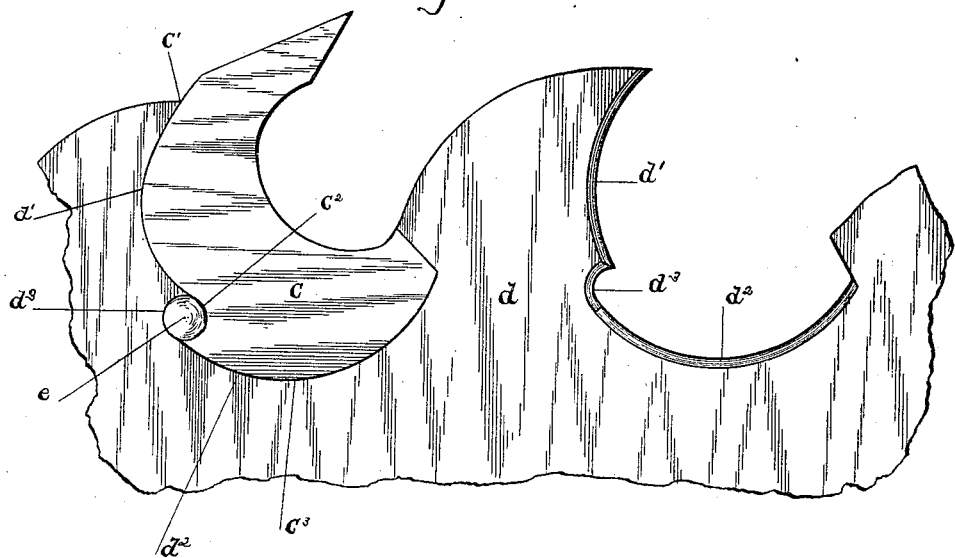
Figure 2:
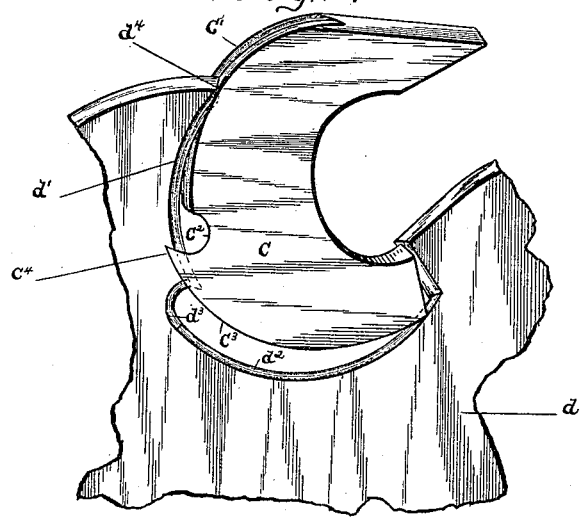

In the drawings, Figure 1 is a segmental side view of a saw-plate, showing one of my improved teeth inserted. Fig. 2 is a similar view in perspective showing the manner of inserting the tooth.

It is well known that in some of the old forms of inserted teeth the tooth has its grooved contacting edge cut on the arc of a single circle and recessed at about the center of said arc to receive a corresponding projection or enlargement on the tooth-frame, the parts being permanently held together by a securing-rivet. When the cutting-point of said tooth wears away in being repeatedly sharpened, the inner curve is cut away correspondingly to preserve the perfect cutting action of the tooth, which results in a much too rapid weakening of the tooth across the portion where the recess is located.

The primary object of my invention is to construct such a form of tooth as will both increase its strength and lengthen its life, and I have accomplished it in the following manner:

Referring to Figs. 1 and 2, $c$ represents my improved form of tooth, which, as will be seen, has its inner grooved contacting edge formed first on a curve $c'$, extending about half-way to a small semicircular recess $c^2$, which extends outwardly, and from its other point another circle $c^3$, differently centered, extends to the rear of the tooth, which has the effect, as shown, of considerably thickening the tooth at the point of its greatest strain, or, in other words, at the point where the wearing away of the tooth in sharpening would naturally weaken the tooth the greatest. The tooth-frame $d$ has its socket formed correspondingly with its two different-pointed circular edges $d'$ and $d^2$ and small semicircular recess $d^3$. The tooth $c$ is inserted, as clearly shown in perspective in Fig. 2, the start being made by placing the point $d^4$ of the frame in the grooved circle $c'$, as shown, the point $c^4$ of the tooth resting against the outside of the frame, also as shown, and by swinging the tooth inwardly it drops into place and is permanently secured and held in position by the rivet $e$, as shown in Fig. 1.

I claim—

1. An insertible saw-tooth having its contacting edge formed of the arcs of two differently-centered circles, with an intermediate semicircle joining their adjacent ends, the base portion of the tooth being wider at the intersection of its outer edge with the semicircle than the point portion at the intersection of its outer edge with the semicircle, substantially as described.

2. A saw provided with a series of recesses upon its operating-edge, the edges of said recesses each being formed in the arcs of two differently-centered circles, the adjacent ends of which are joined by a small semicircle, the point formed by the intersection of the first or outer circle and the semicircle overhanging the second or inner circle, an insertible tooth in each recess, the contacting edge of which is formed of the arcs of two differently-centered circles, with an intermediate small semicircle joining their adjacent ends, the base portion of the tooth being wider at the intersection of its outer edge with the semicircle than the point portion at the intersection of its outer edge with the semicircle, and a rivet between the portions of the saw and the tooth formed by the two small semicircles, substantially as described.

In testimony whereof I have signed my name to this specification in the presence of two subscribing witnesses.

WILLIAM DUNBAR.

Witnesses:
JUDSON J. NEWMAN,
W. T. MILLER.